US008677310B2

(12) United States Patent
Weatherhead

(10) Patent No.: US 8,677,310 B2
(45) Date of Patent: Mar. 18, 2014

(54) INDUSTRY TEMPLATE ABSTRACTING AND CREATION FOR USE IN INDUSTRIAL AUTOMATION AND INFORMATION SOLUTIONS

(75) Inventor: N. Andrew Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1106 days.

(21) Appl. No.: 12/164,724

(22) Filed: Jun. 30, 2008

(65) Prior Publication Data

US 2009/0327992 A1 Dec. 31, 2009

(51) Int. Cl.
*G06F 9/44* (2006.01)

(52) U.S. Cl.
USPC ........... 717/102; 717/103; 717/104; 717/126; 700/97; 700/131

(58) Field of Classification Search
USPC ...................... 717/100–113, 122–124; 700/97
See application file for complete search history.

(56) References Cited

U.S. PATENT DOCUMENTS

| | | | |
|---|---|---|---|
| 4,536,840 A | 8/1985 | Borta | |
| 4,831,580 A | 5/1989 | Yamada | |
| 5,493,508 A | 2/1996 | Dangelo et al. | |
| 5,671,415 A * | 9/1997 | Hossain | 717/101 |
| 5,870,588 A | 2/1999 | Rompaey et al. | |
| 5,920,718 A | 7/1999 | Uczekaj et al. | |
| 5,966,532 A | 10/1999 | McDonald et al. | |
| 6,053,951 A | 4/2000 | McDonald et al. | |
| 6,106,569 A * | 8/2000 | Bohrer et al. | 717/100 |
| 6,117,187 A | 9/2000 | Staelin | |
| 6,163,878 A | 12/2000 | Kohl | |
| 6,170,081 B1 | 1/2001 | Fontana et al. | |
| 6,230,318 B1 | 5/2001 | Halstead et al. | |
| 6,243,857 B1 | 6/2001 | Logan, III et al. | |
| 6,275,976 B1 * | 8/2001 | Scandura | 717/120 |
| 6,476,828 B1 | 11/2002 | Burkett et al. | |
| 6,564,368 B1 | 5/2003 | Beckett et al. | |
| 6,564,375 B1 | 5/2003 | Jiang | |
| 6,574,791 B1 | 6/2003 | Gauthier et al. | |
| 6,615,198 B1 | 9/2003 | Aldrich | |
| 6,681,383 B1 * | 1/2004 | Pastor et al. | 717/126 |
| 6,816,814 B2 | 11/2004 | Ebert et al. | |
| 6,832,118 B1 * | 12/2004 | Heberlein et al. | 700/18 |
| 6,871,340 B1 | 3/2005 | Gillis | |
| 6,957,418 B2 | 10/2005 | Batcha et al. | |
| 6,980,941 B2 | 12/2005 | Iwamasa | |
| 7,000,219 B2 * | 2/2006 | Barrett et al. | 717/107 |
| 7,047,518 B2 | 5/2006 | Little et al. | |
| 7,076,762 B2 | 7/2006 | Fisher | |

(Continued)

OTHER PUBLICATIONS

Precise Specification and Automatic Application of Design Patterns, Eden et al. Nov. 2007.*

(Continued)

*Primary Examiner* — Lewis A Bullock, Jr.
*Assistant Examiner* — Tina Huynh
(74) *Attorney, Agent, or Firm* — Amin, Turocy & Watson, LLP

(57) ABSTRACT

The invention relates to a system and/or methodology for the abstraction and creation of templates for use in industrial automation. The system providing for the abstraction of one or more engineering specifications, and creation of design templates based at least in part on the abstracted design templates. Additionally, the invention provides a user interface for modification of the template creation process and/or templates.

15 Claims, 10 Drawing Sheets

(56) References Cited

U.S. PATENT DOCUMENTS

| | | | |
|---|---|---|---|
| 7,159,183 | B1 | 1/2007 | Kudukoli et al. |
| 7,210,117 | B2 | 4/2007 | Kudukoli et al. |
| 7,243,334 | B1 | 7/2007 | Berger et al. |
| 7,266,806 | B2 | 9/2007 | Choi et al. |
| 7,299,155 | B2 | 11/2007 | Ebert et al. |
| 7,340,684 | B2 | 3/2008 | Ramamoorthy et al. |
| 7,356,773 | B1 | 4/2008 | Barraclough |
| 7,464,365 | B2 | 12/2008 | Iwamasa et al. |
| 7,571,419 | B2 | 8/2009 | O'Brien |
| 7,650,588 | B2 | 1/2010 | Ivansen |
| 8,146,061 | B2 | 3/2012 | Xu et al. |
| 2001/0025236 | A1* | 9/2001 | America .................... 703/22 |
| 2001/0047402 | A1* | 11/2001 | Saimi et al. .............. 709/219 |
| 2002/0091990 | A1* | 7/2002 | Little et al. .............. 717/105 |
| 2002/0100014 | A1* | 7/2002 | Iborra et al. ............. 717/104 |
| 2002/0103558 | A1 | 8/2002 | Iwamasa et al. |
| 2003/0028408 | A1 | 2/2003 | RuDusky et al. |
| 2003/0033234 | A1 | 2/2003 | RuDusky et al. |
| 2003/0055658 | A1 | 3/2003 | RuDusky et al. |
| 2003/0055769 | A1 | 3/2003 | RuDusky et al. |
| 2003/0055770 | A1 | 3/2003 | RuDusky et al. |
| 2003/0055771 | A1 | 3/2003 | RuDusky et al. |
| 2003/0061409 | A1 | 3/2003 | RuDusky et al. |
| 2003/0066057 | A1 | 4/2003 | RuDusky et al. |
| 2003/0188291 | A1* | 10/2003 | Fisher ....................... 717/102 |
| 2004/0093186 | A1 | 5/2004 | Ebert et al. |
| 2004/0163072 | A1 | 8/2004 | Levy et al. |
| 2004/0236446 | A1* | 11/2004 | Sato et al. .................. 700/97 |
| 2005/0091618 | A1 | 4/2005 | Ebert et al. |
| 2005/0138603 | A1* | 6/2005 | Cha et al. .................. 717/120 |
| 2005/0198611 | A1 | 9/2005 | Ebert et al. |
| 2005/0198615 | A1 | 9/2005 | Choi et al. |
| 2005/0216887 | A1 | 9/2005 | Robertson et al. |
| 2005/0221266 | A1* | 10/2005 | Mislevy et al. ............ 434/322 |
| 2007/0050358 | A1* | 3/2007 | Ganesh et al. ................ 707/6 |
| 2007/0130558 | A1 | 6/2007 | Ivansen |
| 2007/0130561 | A1* | 6/2007 | Siddaramappa et al. ..... 717/106 |
| 2007/0162268 | A1* | 7/2007 | Kota et al. .................. 703/14 |
| 2007/0214449 | A1 | 9/2007 | Choi et al. |
| 2008/0033968 | A1* | 2/2008 | Quan et al. ................ 707/100 |
| 2008/0040704 | A1* | 2/2008 | Khodabandehloo et al. . 717/105 |
| 2008/0097630 | A1* | 4/2008 | Weatherhead et al. ......... 700/86 |
| 2008/0126407 | A1* | 5/2008 | Shimaoka et al. ......... 707/103 Y |
| 2008/0127040 | A1* | 5/2008 | Barcellona ................ 717/101 |
| 2008/0195994 | A1 | 8/2008 | O'Brien |
| 2008/0301625 | A1* | 12/2008 | Cook et al. ................. 717/104 |
| 2008/0301626 | A1* | 12/2008 | Sivaram .................... 717/104 |
| 2009/0158257 | A1 | 6/2009 | Xu et al. |

OTHER PUBLICATIONS

Integrated Automated Design approach for Building Automation Systems, Runde et al., Mar. 2008.*

Creating the architecture of a Manufacturing Framework by Design Patterns, Hans Albrecht Schmid, 1995.*

Walter Zimmer, Relationships between Design Patterns, Nov. 7, 2007.*

Mapelsden et al., Design Pattern Modelling and Instantiation using DPML, Jun. 18, 2002.*

Notice of Allowance dated Apr. 25, 2012 for U.S. Appl. No. 12/164,901, 55 pages.

Sidhu, Deepinder P., "Logic Programming Applied to Hardware Design Specification and Verification," 1984, IEEE. p. 309-313.

Mir et al., "Re-engineering Hardware Specifications by Exploting Design Semantics," 1994, ACM, p. 336-341.

Gajski et al., "Specification and Design of Embedded Hardware-Software Systems," 1995, IEEE, p. 53-67.

OA dated Nov. 23, 2011 for U.S. Appl. No. 12/164,901, 43 pages.

* cited by examiner

INDUSTRY TEMPLATE ABSTRACTING AND CREATION FOR USE IN INDUSTRIAL AUTOMATION AND INFORMATION SOLUTIONS

TECHNICAL FIELD

The subject invention relates generally to industrial automation design, and more particularly to the abstracting and creation of industrial design templates.

BACKGROUND

Industrial Automation has revolutionized manufacturing in a rapidly expanding range of applications. As engineers strive to create systems of ever increasing complexity, the development of new and innovative information solutions has become more essential. Increases in computer networking capability, processing power, and storage capacity have made faster, smarter and more reliable automation systems possible. However, the efficiency at which the systems can be designed, programmed, and installed has largely lagged behind the pace at which the automation systems themselves are improving.

Currently, industrial automation designers, programmers, and engineers are often required to reengineer identical or similar components repeatedly for different projects. In addition, frequently a high degree of redundancy exists between the designs of components for unrelated projects. This redundancy can be caused by industry specific, customer specific, and/or application specific requirements.

The continual reinventing and reengineering of identical or similar components is highly inefficient. Moreover, due to the high degree of redundancy the constant rehashing of similar subject matter is wholly unnecessary. Consequently, a substantial need exists for an industrial automation information solution that reduces the necessity for reengineering and increases efficiency.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The claimed subject matter relates to a system and/or method for the abstraction and creation of design templates. In accordance with various aspects of the claimed subject matter, an abstraction component obtains one or more engineering specifications. The engineering specifications can include one or more class specific layers, such as a customer specific layer, an industry specific layer, a project specific layer, and an application specific layer.

The system abstracts the design specification by removing one or more of the class specific layers. The class specific layers include class specific definitions, where the definitions contain one or more user and/or system requirements. Removing the class specific layers also removes the class specific requirements. Consequently, the remainder is an abstracted engineering specification.

A design pattern component generates a design pattern (e.g. template) based at least in part on the abstracted engineering specification. Additionally, the design pattern component can generalize the identifiers and designations in the abstracted design pattern. The design pattern component can also format the template for use with a template management system, or automated design system.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
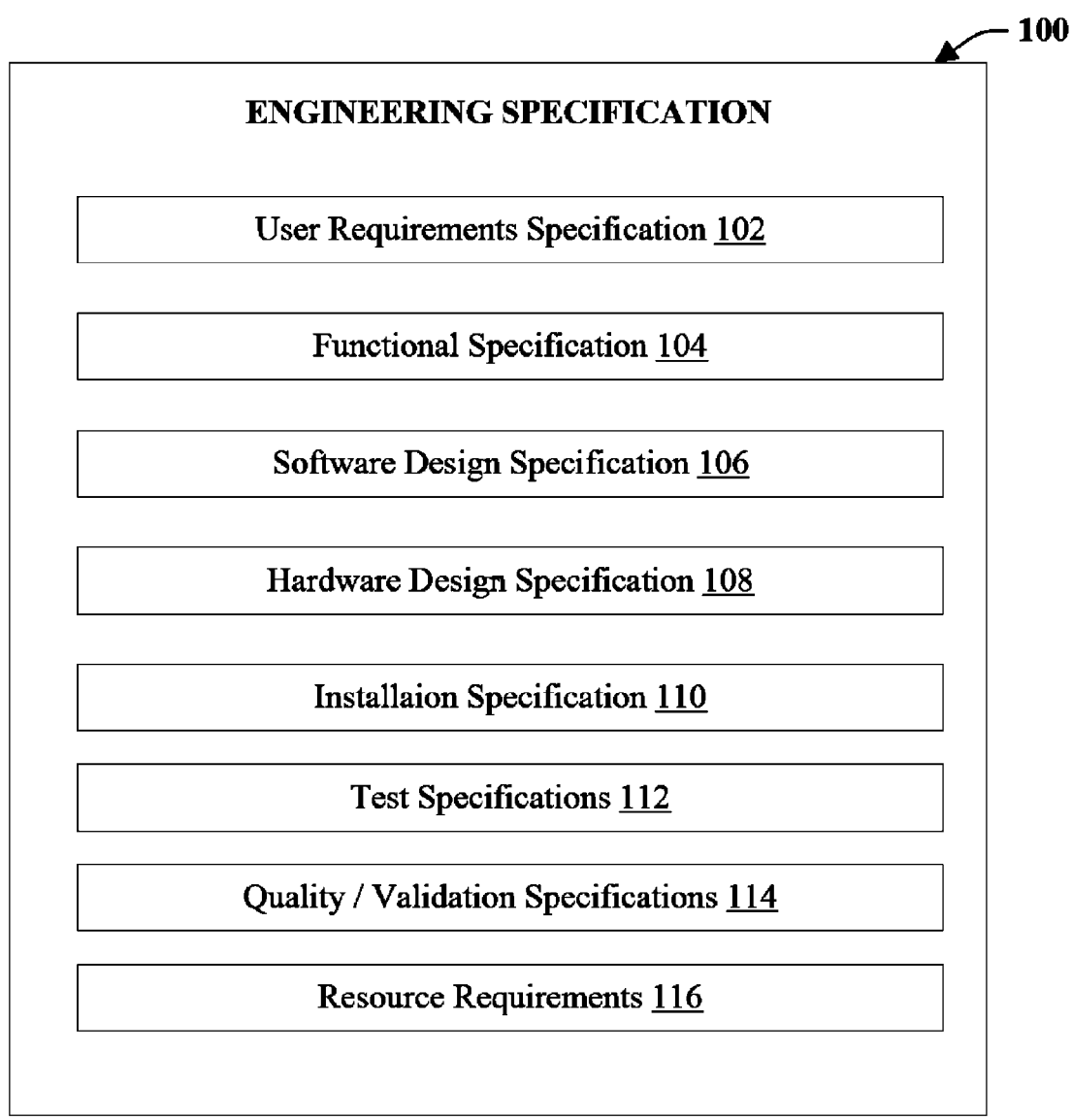
FIG. 1 is an exemplary illustration of an engineering specification shown in accordance with an aspect of the present invention.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, an exemplary illustration of an engineering specification 100 is shown in accordance with an aspect of the present invention. The engineering specification 100 is a collection of sub-specifications containing industry, project, customer, and/or application specific design elements. The sub-specifications 100 can include but are not limited to a user requirements specification 102, a functional specification 104, a software design specification 106, a hardware design specification 108, an installation specification 110, a test specification 112, a quality/validation specification, and a resource requirements 116.

The user requirements specification 102 includes general information regarding the objectives and goals of the user's project or group of projects. For example, the user requirements specifications 102 can state that the goal of a particular project is to manufacture widgets. Additionally, the user requirements specifications 102 can include quality specifications such as the rate at which the widgets need to be manufactured, the size of the widgets, quality tolerances, etc.

The functional specifications 104 include the engineering processes necessary to make the specified number of widgets, at the specified rate, within said quality tolerances. The functional specifications 104 can include the equipment to be used, the sequence of operations, process inputs and outputs, process parameters, process data, operator interaction, and so forth.

The software design specifications 106 relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The hardware design specifications 108 are high-level representations of one or more hardware modules, and configurations of the modules, designed to execute the objectives of the functional specifications 104 and/or the software design specifications 106. For example, if the functional specifications 104 and software design specifications 106 require a flow meter, the hardware design specifications 108 can include the inputs and outputs (I/O) required for the flow meter, the network(s) that must to be connected to the I/O points, whether a control cabinet is necessary, and so forth. The hardware design specifications 108 can be illustrated as drawings (e.g. electrical drawings, mechanical drawings, etc.), flowcharts, block diagrams, etc.

Additionally, the hardware design specifications 108 can be used to generate a comprehensive list of the hardware required for the project based on the hardware design specifications. The list can be a bill of materials (B.O.M.), wherein the B.O.M. can include but is not limited to part names, quantities, part numbers, manufacturers, etc. The installation specifications 110 detail specifications of materials necessary to install the hardware modules, including but not limited to runs of wire, termination boxes, wiring specifications, conduit specifications, piping, definitions, etc.

The testing specifications 112 can be used to qualify a design build prior to installation, including any prebuilt software or hardware modules. In addition, the testing specifications 112 can detail software or hardware modules tests to be executed during or after the installation. For example, site acceptance testing can detail test for the I/O, communications, controls, and so forth once installation of the project is complete.

Additionally, the testing specifications can include code tests for generated software code. Code testing can test the code to ensure it provides each function outlined in the functional specification(s) 104. Code testing may not need to test every instance of code, because a given project may require multiple instances of the same code. For instance, a functional specification may require a series of flow meters to perform an operation. Each instance of a flow meter may be designed in a similar manner, resulting in multiple instances of similar or identical software code. Consequently, code testing may only be required to check a single instance of a flow meter to ensure that all related flow meter codes are functioning correctly. Moreover, the testing specifications 112 can detail a testing schema, and are based at least in part on the functional specifications 104, and software design specifications 106. Additionally, for each test performed one or more testing reports that detail the results of the tests can be generated. The testing reports include but are not limited to errors, warnings, accuracy, possible solutions, expected results, actual results, etc.

The Quality/Validation specifications 114 validate test results from the factory acceptance testing and site acceptance testing. In addition, the validation specifications can be used to ensure that each element of the software design and hardware design specifications operate as intended. For example, the validation specifications may be particularly useful for life sciences based projects, where simply testing the design is insufficient, and validation of the test results is required.

The resource requirements 116 represent the cost amount of the project as a maximum value, a minimum value, a target value (e.g. set point), a percentage value, a distribution, a state value (e.g. low, medium, or high), etc. The resource requirements can be based on the user requirements 102 and/or functional specification 104. Additionally, the resources requirements can include a quality metric based at least in part on the user requirements 102. The quality metric can be a real number, a target, a percentage, a distribution, a state (e.g. low, medium, or high), etc. The quality metric can be determined based on the user requirements 102 and/or functional specifications 104. For example, the quality metric for a given project can be set as "high." Subsequently, the other sub-specifications can be adapted to accommodate the quality metric by using only modules, parts, etc. designated as "high" quality. For simplicity of explanation, the systems and methodologies contained herein are described in terms of engineering specifications, however it is to be appreciated that a plurality of types of specifications can be used within the scope of this invention, such as design specifications, marketing specifications, general specifications, and so forth.

Figure 2:
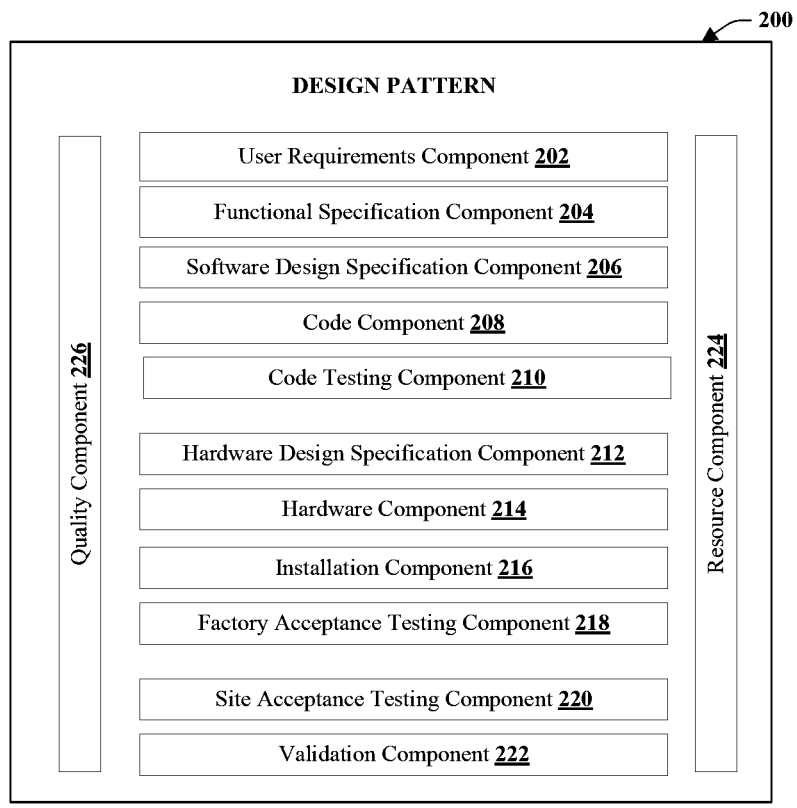
FIG. 2 is an exemplary illustration of a design pattern shown in accordance with an aspect of the present invention.

Referring to FIG. 2, an exemplary illustration of a design pattern 200 is shown in accordance with an aspect of the present invention. The design pattern 200 is an abstracted collection of sub-components containing generic design elements. The sub-components can include but are not limited to a user requirements component 202, a functional specification component 204, a software design specification component 206, a code component 208, a code testing component 210, a hardware design specification component 212, a hardware component 214, an installation component 216, a factory acceptance and testing component 218, a site acceptance and testing component 220, and a validation component 222, a resource component 224, and a quality component 226. It is to be appreciated that the terms design pattern and design template are used interchangeably herein.

The user requirements component 202 obtains one or more user requirements. The user requirements can be obtained from a set of inputs, including explicit user inputs (e.g., configuration selections, question/answer) such as from mouse selections, keyboard selections, speech, scanner and so forth. Additionally or alternatively, the user requirements can be obtained via data transfer from a user computer, a third party computer, an associated computer, a data store, etc. Typically, the user requirements include general information regarding the objectives and goals of the user's project or group of projects. For example, the user requirements can state that the goal of a particular project is to manufacture widgets. Additionally, the user requirements can include quality specifications such as the rate at which the widgets need to be manufactured, the size of the widgets, quality tolerances, etc.

The functional specification component 204 generates one or more functional specifications based on the user requirements, wherein a functional specification is a generic list of equipment required to achieve the described functionality. For example, the functional specification component 204 can determine the engineering processes necessary to make the specified number of widgets, at the specified rate, within said quality tolerances. The functional specifications can include the equipment to be used, the sequence of operations, process inputs and outputs, process parameters, process data, operator interaction, and so forth.

The software design specification component 206 generates one or more software design specifications based on the functional specifications, wherein the software design specifications relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The code component 208 generates pre-built modules of software designed for the abstract which accept the entity relationship defined by the software design specification component 206. The high-level representations contained in the software design specifications are mapped to functions and/or computer executable commands. For example, the software design specification may require a motor to be run at a speed X. The code component 208 can generate the software code necessary to run the motor at speed X. Additionally or alternatively, the code component 208 can generate the code based at least in part on one or more design patterns. For example, if the functional specification requires a type 1 motor to be run at speed X, then the code component 208 can obtain a template regarding running a type 1 motor, and modify the design pattern to operate the motor at speed X.

The code testing component 210 tests the software code generated by the code component 208. The code testing component 210 can test the code to ensure it provides each function outlined in the functional specification(s). The code testing component may not need to test every instance of code, because a given project may require multiple instances of the same code. For instance, a functional specification may require a series of flow meters to perform an operation. The software design specification component 206 and code component 208 can handle each instance of a flow meter in a similar manner, resulting in multiple instances of similar or identical software code. Consequently, the code testing component 210 may only be required to check a single instance of a flow meter to ensure that all related flow meter codes are functioning correctly. Moreover, the code testing component 210 can produce one or more testing specifications. The testing specifications detail a testing schema, and are based at least in part on the functional specifications, and software design specifications. Additionally, for each test performed the code testing component 210 can subsequently generate one or more testing reports that detail the results of the tests. The testing reports including but not limited to errors, warnings, accuracy, possible solutions, expected results, actual results, etc.

The hardware design specification component 212 generates one or more hardware design specifications based on the functional specifications and/or software design specifications. The hardware design specifications are high-level representations of one or more hardware modules, and configurations of the modules, designed to execute the objectives of the functional specification and/or the software design specifications. For example, if the functional specifications and software design specifications require a flow meter, the hardware design specification component 212 can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, the hardware design specification component 212 can add one or more additional specification requirement layers, including but not limited to customer specific requirements, industry specific requirements, application specific requirements, and/or project specific requirements. For example, if the project is for an industry that requires explosion proof materials, then the design specification component 212 can add a corresponding industry specific requirements layer to the hardware design specifications. Similarly, if a customer has specific requirements, then an appropriate customer requirements layer can be added to the hardware design specification.

The hardware component 214 can generate a comprehensive list of the hardware required for the project based on the hardware design specifications. The list can be a bill of materials (B.O.M.), wherein the B.O.M. can include but is not limited to part names, quantities, part numbers, manufacturers, etc.

The installation component 216 can generate one or more installation specifications based on the hardware design specifications and the B.O.M. The installation specifications detail specifications of materials necessary to install the hardware modules, including but not limited to runs of wire, termination boxes, wiring specifications, conduit specifications, piping, definitions, etc.

The factory acceptance testing component 218 can qualify a design build prior to installation, including any prebuilt software or hardware modules. For example, the factory acceptance testing component 218 can test the I/O, communications, controls, and so forth of prebuilt software modules and control panels. In addition, the site acceptance testing component 220 can test software or hardware modules during or after the installation. For example, the site acceptance testing component 220 can test the I/O, communications, controls, and so forth once installation of the project is complete.

The validation component 222 validates test results from the factory acceptance testing component 218 and site acceptance testing component 220. Additionally, the validation component 222 can ensure that each element of the software design and hardware design specifications operate as intended. For example, the validation component may be particularly useful for life sciences based projects, where simply testing the design is insufficient, and validation of the test results is required.

The resource component 224 determines a cost amount (e.g. money, time, etc.) for a given project or set of projects. The resource component 224 can represent the cost amount as a maximum value, a minimum value, a target value (e.g. set point), a percentage value, a distribution, a state value (e.g. low, medium, or high), etc. The resource component 224 can determine the cost amount based on the user requirements and/or functional specification. Additionally or alternatively, the resource component 224 can infer the cost amount. The cost amount can be used by both the one or more other components in order to generate the engineering specifications. For example, the resource component 224 can determine that the maximum amount for a project is $20,000. The software design specification component 206, the hardware design specification component 212, and the hardware component 214 will maintain an aggregate cost of less than or equal to the maximum amount of $20,000.

The quality component 226 determines a quality metric based at least in part on the user requirements. The quality metric can be a real number, a target, a percentage, a distribution, a state (e.g. low, medium, or high), etc. The quality metric can be determined based on the user requirements and/or functional specifications, and can be one or more additional sub-components. For example, the quality component 226 can determine that the quality metric should be "high." Subsequently, the other sub-components will adapt their designs to accommodate the quality metric by using only modules, parts, etc. designated as "high" quality. It is appreciated that the quality component 226 and resource component 224 can be related, because typically there is a correlation between resources and quality. For example, as the cost of the modules increases presumably the quality does as well, and vice versa. Therefore, it may be desirable to integrate the resource component 224 and quality component 226.

Figure 3:
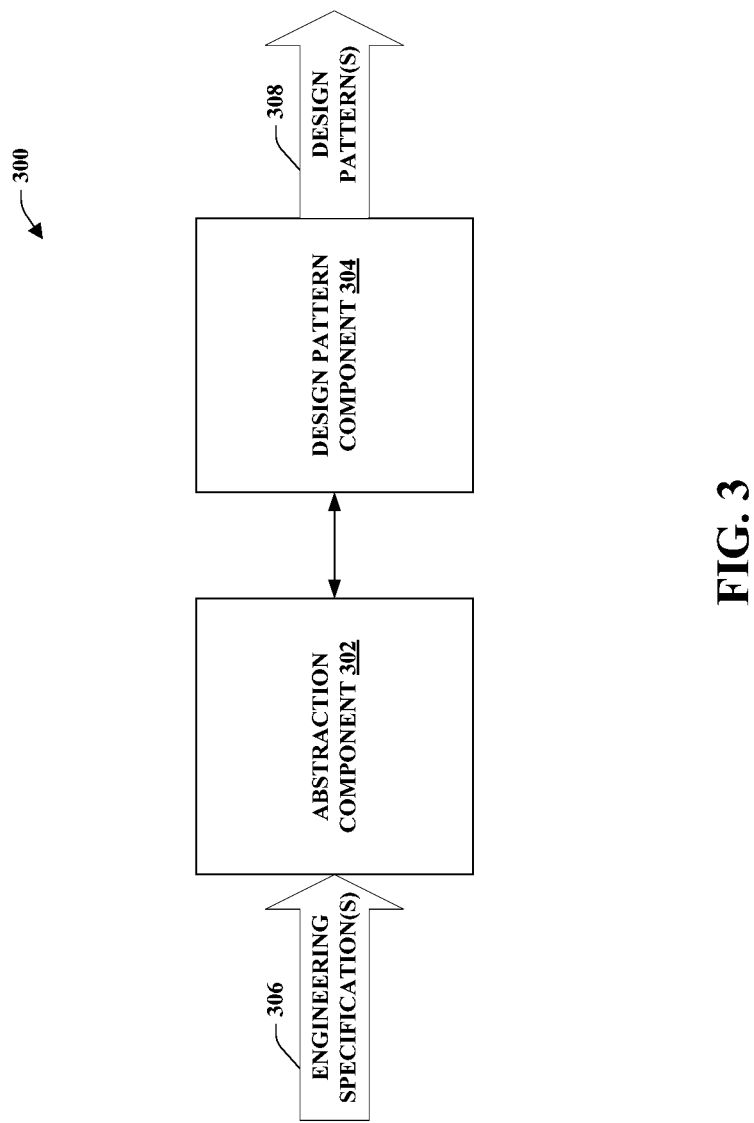
FIG. 3 is a general component block diagram illustrating a system for configuration and creation of industrial automation designs in accordance with an aspect of the present invention.

Referring to FIG. 3, a template abstraction and creation system 300 is illustrated in accordance with an aspect of the subject invention. The system 300 includes an abstraction component 302, and a design pattern component 304. The abstraction component 302 obtains one or more engineering specifications 306 (discussed supra). The engineering specifications 306 can be acquired via various means. For instance, the engineering specifications can be acquired via user inputs, data transfers (from end users, third parties, associated applications, vendors, manufacturers, etc.), and so forth.

The abstraction component 302 abstracts the engineering specifications 306 by removing one or more class specific layers included therein. The class specific layers contain one or more sub-components which are associated with the design pattern (e.g. design templates) sub-components (discussed infra). The class specific layers can include but are not limited to an industry specific layer, a customer specific layer, an application specific layer, and a project specific layer. The class specific layers contain class specific definitions, which define one or more class specific requirements. Consequently, removing one or more class specific layers from the engineering specification 306 removes class specific requirements from the design elements, thus abstracting the engineering specification 306. For example, the abstraction of a Flow Meter Engineering Specification (discussed supra), may be as follows: The industry specific layer may include certain regulatory details specific to a given industry, the customer specific layer may include pre-selected vendors for the equipment defined or a particular data set expected from the software, the application specific layer may include details such as environmental details (e.g. explosive environment), and the project specific layer may add specific equipment configuration details to match the actual physical equipment configuration.

The design pattern component 304 creates a design pattern 308 (e.g. template) based at least in part on the abstracted engineering specifications 306. The creation of a template 308 can include but is not limited to formatting the engineering specification for use as a template 308, and generalizing designations and identifiers. For example, generalization of an engineering specification 306 can be required to remove installation conditions that do not suit the creation of a design template 308. In another example, the design pattern component 304 can remove descriptions contained in an installation specification of the engineering specification 306 relating to an operating system and/or asset tag associated with the equipment on which the software was installed.

Figure 4:
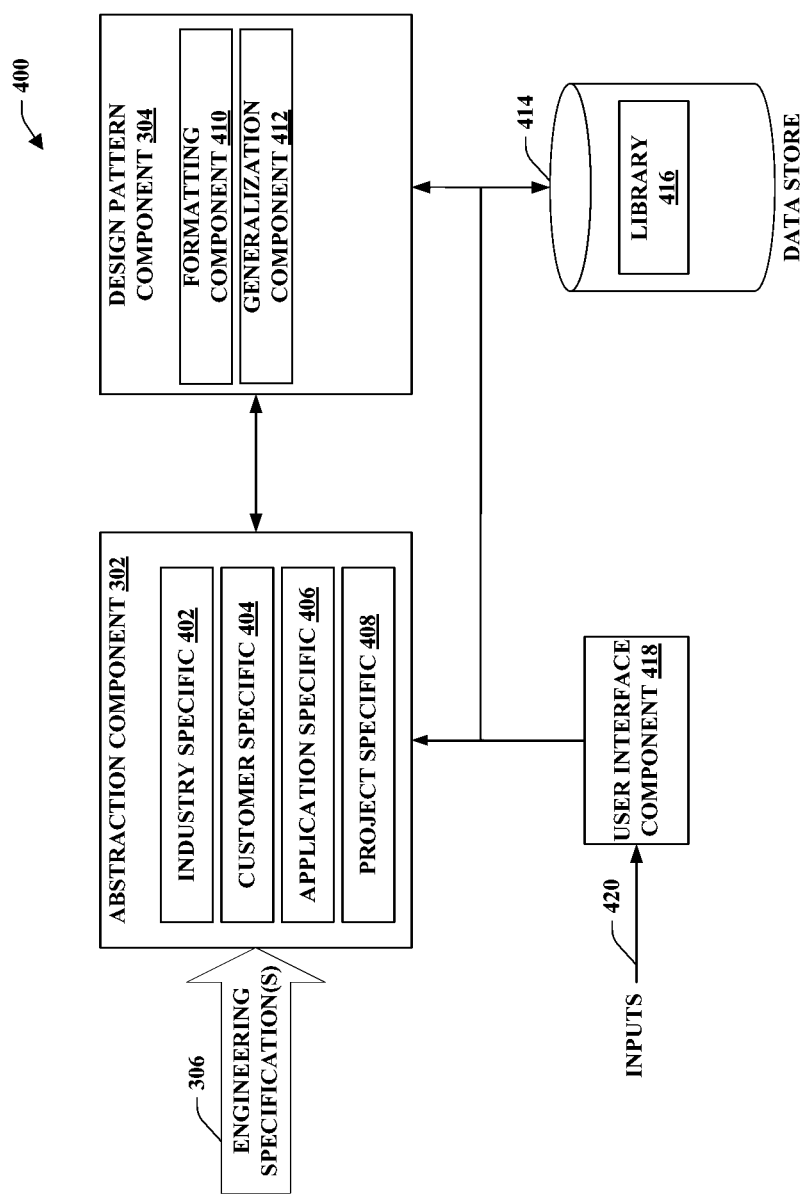
FIG. 4 is a general component block diagram illustrating a system for configuration and creation of industrial automation designs in accordance with an aspect of the present invention.

Referring to FIG. 4, a template abstraction and creation system 400 is illustrated in accordance with an aspect of the subject invention. The system 400 includes an abstraction component 302, and a design pattern component 304. The abstraction component 302 includes an industry specific layer component 402, a customer specific layer component 404, an application specific layer component 406, and a project specific layer component 408. As noted supra, the abstraction component 302 collects one or more engineering specifications 306. The engineering specifications 306 can be obtained via various means. For instance, the engineering specifications can be acquired via user inputs, data transfers (from end users, third parties, associated applications, vendors, manufacturers, etc.), and so forth.

The industry specific layer component 402 can analyze the engineering specifications 306 to identify included industry specific layers. The industry specific layers can contain the engineering specification's 306 industry specific definitions, which define the industry specific requirements, functionality, design, etc. For example, a subject industry may require the use of explosion resistant equipment, or certain regulatory/environmental controls, which are defined by the industry specific layer. Additionally, the industry specific layer component 402 can remove or extract one or more included industry specific layers from the engineering specification 306.

The customer specific layer component 404 can analyze the engineering specifications 306 to identify included customer specific layers. The customer specific layers can contain the engineering specification's 306 customer specific definitions. For example, a customer may require the use of only Allen Bradley Programmable Logic Controllers (PLCs), or the customer may have specific sustainability requirements, and these requirements, functions, designs, etc. are defined by the customer specific layer.

The application specific layer component 406 can analyze the engineering specifications 306 to identify the application specific layers. The application specific layers can contain the engineering specification's 306 application specific definitions. For example, a particular application may require the use of a certain type of wire, or a certain grouping of equipment, and these requirements are defined by the application specific layer. Additionally, the application specific layer component 406 can remove or extract one or more application specific layers from the engineering specification 306.

The project specific layer component 408 can analyze the engineering specifications 306 to identify the project specific layers. The project specific layers can contain the engineering specification's project specific definitions. For example, a project may require a particular set of process data, and said process data can be defined by the project specific layer. Additionally, the project specific layer component 408 can remove or extract one or more project specific layers from the engineering specification 306.

Removing class specific layers abstracts an engineering specification 306 by extracting all the class specific content, and leaving the engineering specification's 306 generic design elements. The abstracted design patterns are communicated to the design pattern component 304. The design pattern component 304 creates templates based at least in part on the abstracted engineering specifications 306, and includes a formatting component 410, and a generalization component 412. The formatting component 410 formats the abstracted engineering specifications 306 for use as templates. Formatting the design patterns can include adapting them for use with a template management and/or automated design system. Additionally, formatting can include modifying the design patterns to meet system 400 defined structural requirements. The generalization component 412 generalizes designations and identifiers contained in the engineering specifications 306. The design pattern component 304 can update the data store 414 with the created templates. The data store 414 can include a library 416 where the templates are maintained, and can be retrieved for use in other projects.

The system 400 further includes a user interface component 418. The user interface component 418 can receive various inputs 420, the inputs 420 can include explicit user inputs (e.g., configuration selections, question/answer) such as from mouse selections, keyboard selections, speech, and so forth. The user interface component 418 enables user interaction with at least one of the abstraction component 302, the design pattern component 304, or the library 416. User interaction can be enabled through a plurality of means, such as a series of graphical user interfaces (GUI). For example, the user interface component 418 can expose one of more interfaces that enable modification of the template creation process, including the abstraction of the engineering specifications 306, template formatting, or template generalization. For instance, the user interface component 418 can enable a user to determine the class specific layers to be removed, select a format for the template(s) to be created, or determine a generalization, formatting, or abstraction schema.

Figure 5:
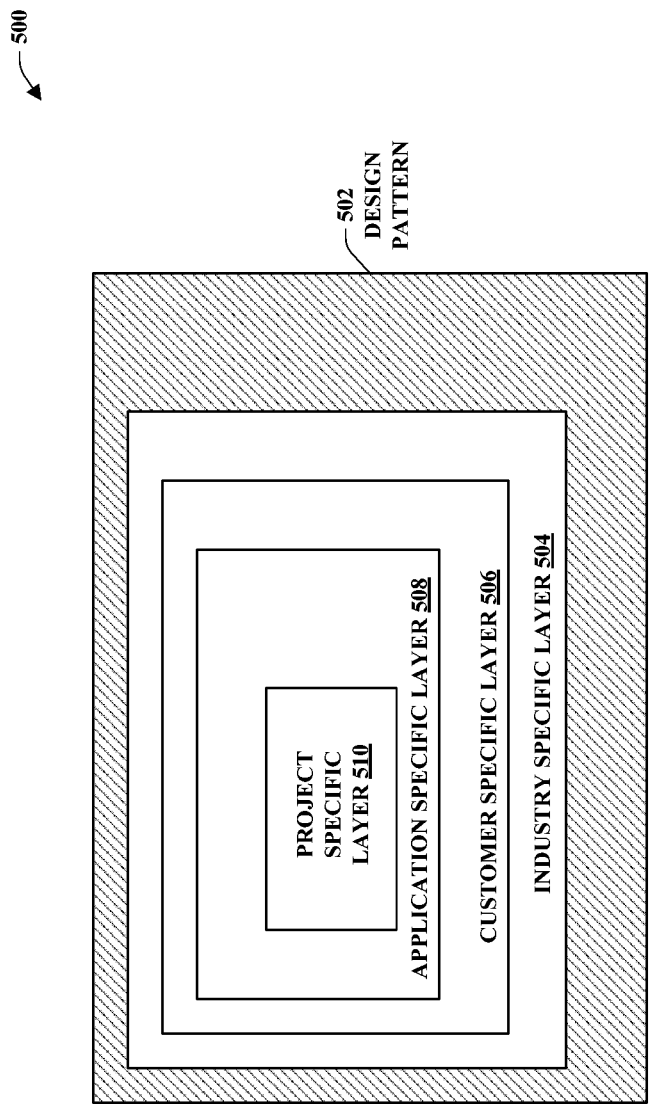
FIG. 5 is an exemplary application of a design pattern in accordance with an aspect of the subject invention.

Referring to FIG. 5, an exemplary illustration of design pattern 502 abstraction is shown in accordance with an aspect of the present invention. The design patterns 502 are in essence abstracted collections of sub-components having generic design elements. The design pattern 502 can be generated by extracting one or more class specific layers from an engineering specification (discussed supra). The class specific layers include an industry specific layer 504, a customer specific layer 506, an application specific layer 508, and a project specific layer 510. For instance, an engineering specification can require a customer specific layer 506, wherein the customer specific layer 506 includes a set of customer specific definitions. The customer specific definitions can include various requirements, and removing the customer specific layer 506 abstracts the engineering specification by removing the customer specific definitions from the generic sub-components.

Figure 6:
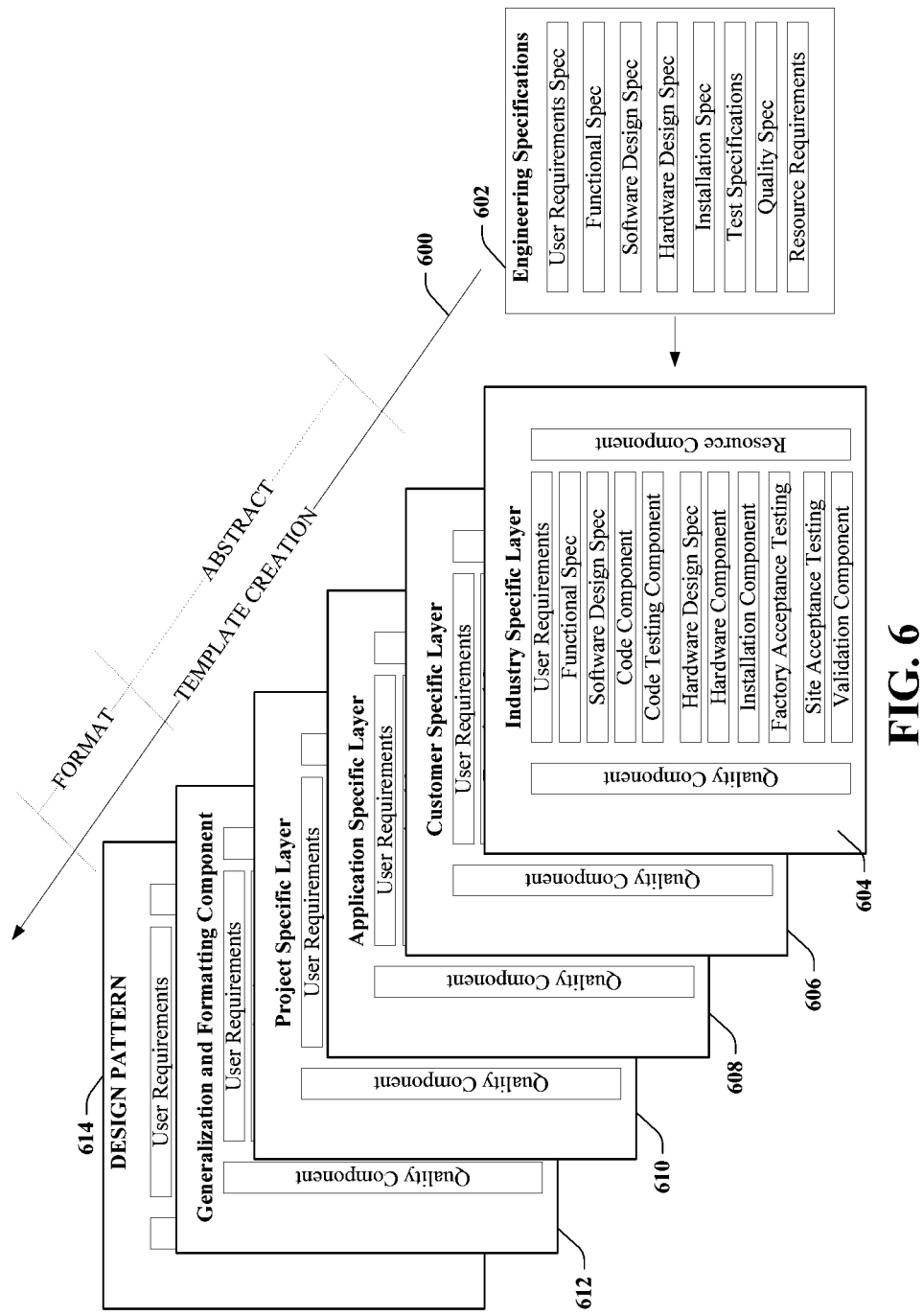
FIG. 6 illustrates an exemplary application of a design pattern abstraction and creation system in accordance with an aspect of the present invention.

Referring to FIG. 6, an exemplary process 600 for design pattern abstraction and creation is shown in accordance with an aspect of the present invention. The process 600 is illustrated as proceeding along a template creation line from the most specialized application (e.g. engineering specification) to the most generic application (e.g. design pattern). The process 600 commences with an engineering specification 602. The engineering specification 602 can be abstracted by removing one or more class specific layers thereto. As previously discussed, removing one or more class specific layers abstracts the engineering specification 602 by removing class specific definitions from the generic design elements. The class specific layers can include but are not limited to an industry specific layer 604, a customer specific layer 606, an application specific layer 608, and a project specific layer 610. Additionally, the class specific layers can include one or more sub-components. For instance, the class specific layers can include sub-components associated with the sub-components contained in the design pattern 614 (discussed supra).

The abstracted engineering specifications 602 can be generalized and formatted via a generalization and formatting component 612. The generalization and formatting component 612 generalizes designations and identifiers contained in the engineering specifications 602, and/or any of the sub-components contained in the abstracted engineering specifications 602. In addition, the generalization and formatting component 612 formats the abstracted engineering specifications 602 for use as design patterns 614. The design patterns 614 include the results of the abstracted, generalized, and/or formatted engineering specifications 602. For instance, the initial engineering specification 602 can include a functional specification (discussed supra), and the abstracted, generalized, and/or formatted functional specification generates a functional specification component (discussed supra) that is included in the design pattern 614.

Figure 7:
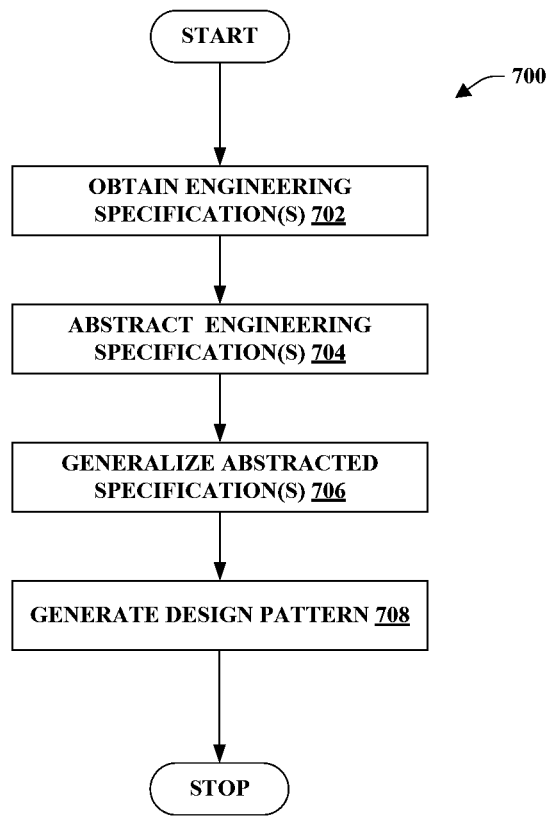
FIG. 7 is a flow chart illustrating a generalized methodology of creating a design pattern in accordance with the present invention.

In view of the exemplary systems described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a methodology 700 that facilitates template abstraction and creation. At 702, one or more engineering specifications are acquired. At 708, the engineering specifications can be abstracted. The engineering specifications can include one or more class specific layers. The class specific layers contain class specific definitions, wherein the definitions include various requirements of the classes. The layers can include but are not limited to a customer specific layer, an industry specific layer, a project specific layer, and an application specific layer. One or more class specific layers can be removed from the engineering specifications. Removing the class specific layers abstracts an engineering specification by extracting the associated class specific content, and the remainder is generic design elements of the engineering specification. At 706, the abstracted engineering specifications can be generalized and/or formatted. At 708, the abstracted, generalized, and/or formatted engineering specifications are used to generate one or more design patterns (e.g. Templates).

It is appreciated that it may not be desirable to completely abstract (e.g. remove all class specific layers) the engineering specifications in every situation. It may be desirable to keep one or more class specific layers during the creation of the design templates. For example, if an engineering specification is targeted toward machinery or a process that is only used in one industry then it may be advantageous for the industry specific layers to be included in the design template.

The design patterns can be stored in a library, wherein the library can be associated with a template management and/or automated design system. Additionally or alternatively, the abstracted engineering specifications can be formatted prior to creation of the design patterns for use with the template management system, and/or the automated design system.

Figure 8:
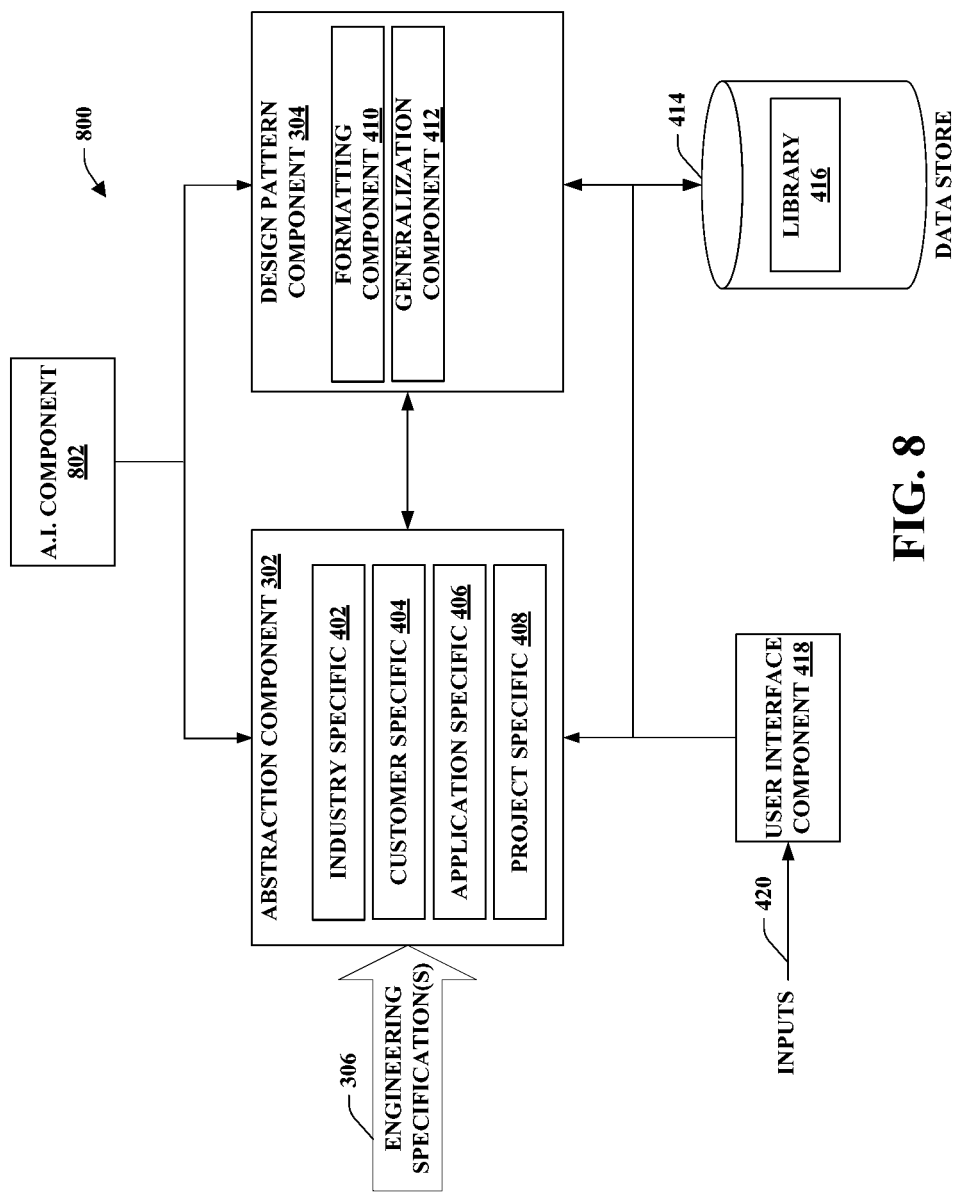
FIG. 8 illustrates a system that employs an artificial intelligence component which facilitates automating one or more features in accordance with the subject invention.

FIG. 8 illustrates a system 800 that employs an artificial intelligence (AI) component 802 which facilitates automating one or more features in accordance with the subject invention. The subject invention (e.g., in connection with inferring) can employ various AI-based schemes for carrying out various aspects thereof. For example, a process for removing the class specific layers can be facilitated via an automatic classifier system and process.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 9:
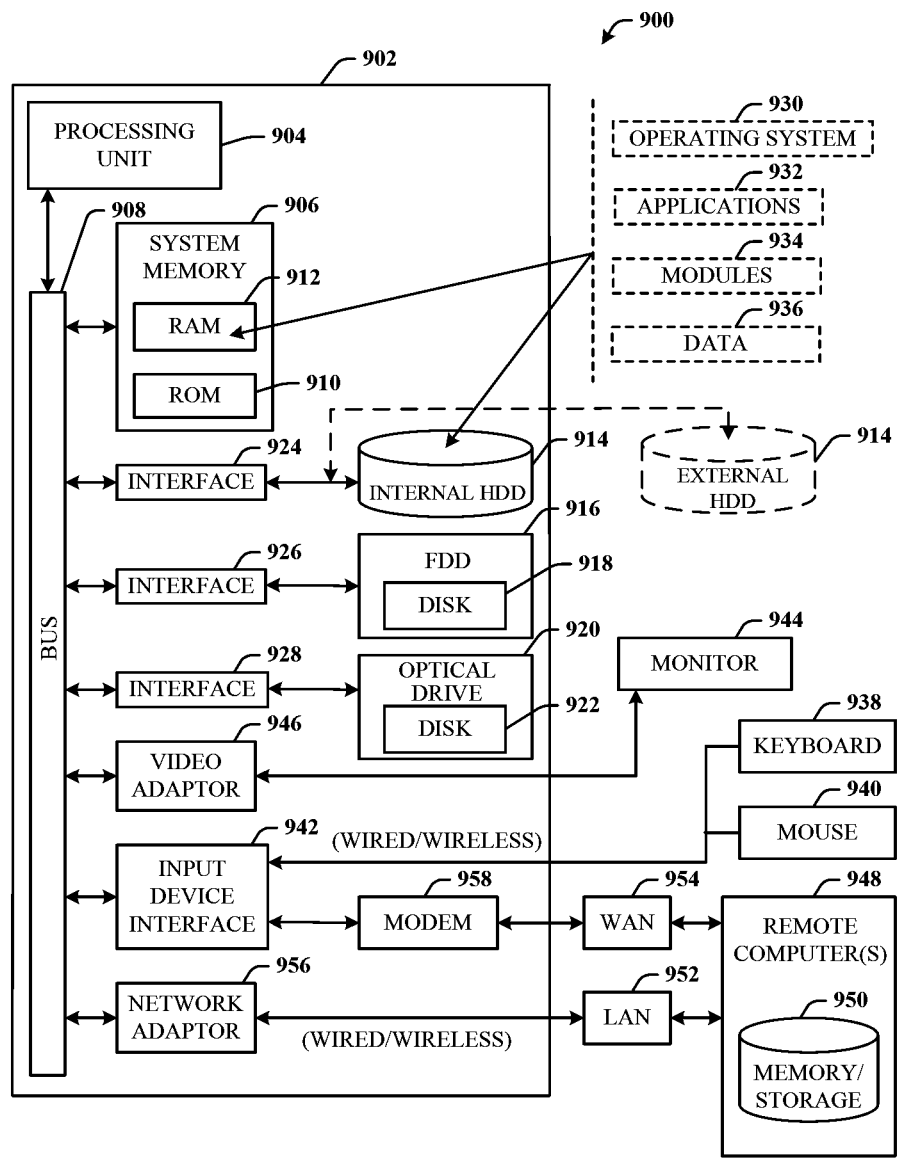
FIG. 9 is a schematic block diagram illustrating a suitable operating environment in accordance with an aspect of the subject invention.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
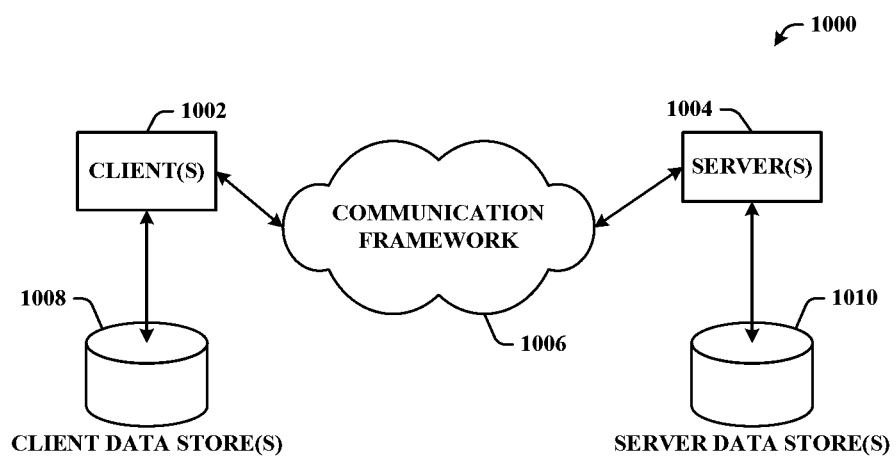
FIG. 10 is a schematic block diagram of a sample-computing environment with which the subject invention can interact.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating design template creation, comprising:
   a processor;
   a non-transitory computer readable medium storing computer executable components and communicatively coupled to the processor to facilitate operation of the computer executable components, the computer executable components, comprising:
   an abstraction component configured to:
      analyze an engineering specification of an industrial process to identify:
         an industry specific layer, via an industry specific layer component, of the engineering specification that specifies one or more requirements specific to an industry in which the industrial process is implemented;
         a customer specific layer, via a customer specific layer component, of the engineering specification that specifies one or more requirements specific to a customer implementing the industrial process;
         an application specific layer, via an application specific layer component, of the engineering specification that specifies one or more requirements specific to an application of the industrial process; or
         a project specification layer, via a project specific layer component, of the engineering specification that specifies one or more requirements specific a project of the industrial process; and
      generate an abstracted engineering specification comprising the engineering specification without the one or more identified industry specific layer, customer specific layer, application specific layer, or project specific layer; and
   a design component configured to generate a design template based at least in part on the abstracted engineering specification.

2. The system of claim 1, wherein the engineering specification includes at least one of a user requirement specification, a functional specification, a software design specification, a hardware engineering specification, an installation specification, a test specification, a quality or validation specification, or a software engineering specification.

3. The system of claim 1, wherein the design component comprises a formatting component configured to format the abstracted engineering specification as the design template for use in template management system.

4. The system of claim 1, wherein the design component comprises a formatting component configured to format the abstracted engineering specification as the design template for utilization by an automated design system.

5. The system of claim 1, wherein the one or more requirements specific to the industry comprise an environmental control.

6. The system of claim 1, wherein the one or more requirements specific to the industry comprise a regulatory control.

7. A method, comprising:
   analyzing, by a device including a processor, an engineering specification of an industrial process, to identify:
      an industry specific layer of the engineering specification that specifies one or more requirements specific to an industry in which the industrial process is implemented;
      a customer specific layer of the engineering specification that specifies one or more requirements specific to a customer implementing the industrial process;
      an application specific layer of the engineering specification that specifies one or more requirements specific to an application of the industrial process; or a project specification layer of the engineering specification that specifies one or more requirements specific a project of the industrial process; and generating, by the device, an abstracted engineering specification comprising the engineering specification without the identified one or more industry specific layer, customer specific layer, application specific layer, or project specific layer; and generating, by the device, a design template based at least in part on the abstracted engineering specification.

8. The method of claim 7, wherein the engineering specification includes at least one of a user requirement specification, a functional specification, a software design specification, a hardware engineering specification, an installation specification, a test specification, a quality or validation specification, or a software engineering specification.

9. The method of claim 7, wherein the one or more requirements specific to the project comprise a physical configuration of equipment.

10. The method of claim 7, wherein the one or more requirements specific to the customer comprise one or more pre-selected vendors of equipment.

11. The method of claim 7, wherein the one or more requirements specific to the industry comprise use of explosion resistant equipment.

12. A non-transitory computer readable medium comprising computer executable instructions that, in response to execution, cause a device including a processor to perform operations, comprising:

analyzing an engineering specification of an industrial process, to identify:

an industry specific layer of the engineering specification that specifies one or more requirements specific to an industry in which the industrial process is implemented;

a customer specific layer of the engineering specification that specifies one or more requirements specific to a customer implementing the industrial process;

an application specific layer of the engineering specification that specifies one or more requirements specific to an application of the industrial process; or a project specification layer of the engineering specification that specifies one or more requirements specific a project of the industrial process; and generating an abstracted engineering specification comprising the engineering specification without the identified one or more industry specific layer, customer specific layer, application specific layer, or project specific layer; and generating a design template based at least in part on the abstracted engineering specification.

13. A method, comprising:

analyzing, by a system including a processor, an engineering specification of an industrial process, wherein the engineering specification includes at least one of a user requirement specification, a functional specification, a software design specification, a hardware engineering specification, an installation specification, a test specification, a qualify or validation specification, or a software engineering specification, to identify:

an industry specific layer of the engineering specification that specifies one or more requirements specific to an industry;

a customer specific layer of the engineering specification that specifies one or more requirements specific to a customer implementing the industrial process;

an application specific layer of the engineering specification that specifies one or more requirements specific to an application of the industrial process; or a project specification layer of the engineering specification that specifies one or more requirements specific a project of the industrial process; and generating, by the system, a design template based at least in part on a modified version of the engineering specification having removed the identified one or more industry specific layer, customer specific layer, project specific layer, or application specific layer.

14. A system, comprising:

means for identifying:

an industry specific layer of an engineering specification of an industrial process, wherein the industry specific layer specifies one or more requirements specific to an industry in which the industrial process is implemented;

a customer specific layer of the engineering specification that specifies one or more requirements specific to a customer implementing the industrial process;

an application specific layer of the engineering specification that specifies one or more requirements specific to an application of the industrial process; or a project specification layer of the engineering specification that specifies one or more requirements specific a project of the industrial process;

means for generating an abstracted engineering specification comprising the engineering specification without the identified one or more industry specific layer, customer specific layer, application specific layer, or project specific layer; and means for generating a design template based at least in part on the abstracted engineering specification.

15. A non-transitory computer readable medium, comprising computer executable instructions that, in response to execution, cause a computing system including a processor to perform operations, comprising:

obtaining an engineering specification relating to an industrial automation manufacturing operation, wherein the engineering specification includes at least one of a user requirement specification, a function specification, a software design specification, a hardware engineering specification, an installation specification, a test specification, a quality or validation specification, or a software engineering specification;

identifying:

an industry specific layer of an engineering specification that specifies one or more requirements specific to an industry in which the industrial automation manufacturing operation is implemented;

a customer specific layer of the engineering specification that specifies one or more requirements specific to a customer implementing the industrial process;

an application specific layer of the engineering specification that specifies one or more requirements specific to an application of the industrial process; or a project specification layer of the engineering specification that specifies one or more requirements specific a project of the industrial process; and generating a design template based at least in part on a modified version of the engineering specification having removed the identified one or more industry specific layer, customer specific layer, application specific layer, or project specific layer.

* * * * *